UNITED STATES PATENT OFFICE.

HOWARD F. CHAPPELL, OF NEW YORK, N. Y.

PURIFYING ALUMINA.

1,079,899.  Specification of Letters Patent.  Patented Nov. 25, 1913.

No Drawing.  Application filed April 22, 1913. Serial No. 762,927.

*To all whom it may concern:*

Be it known that I, HOWARD F. CHAPPELL, a citizen of the United States, residing in the borough of Manhattan, city, county, and State of New York, have invented certain new and useful Improvements in Purifying Alumina; and I do hereby declare the following to be a full, clear, and exact description of the invention, such as will enable others skilled in the art to which it appertains to make and use the same.

The present invention relates to a cheap and efficient method for removing silica from alumina, and it is based upon the discovery that when the silica-containing alumina is raised to a sufficiently high temperature, it becomes practically insoluble in hydrofluoric acid, the solubility of the silica remaining practically unaffected; so that, by subjecting the material, after it has been heated to the desired high temperature, to the action of hydrofluoric acid, either in solution or in a gaseous state, the silica is readily converted into hydrofluosilicic acid or into silicon fluorid, either of which is readily separable from the alumina.

The invention is applicable, for instance, to the treatment of impure alumina obtained by calcining alunite until the alumina contained in it is insoluble in water, and then washing out the alkali present in the calcined product. The alumina thus obtained, contains silica, which it is desirable to remove in order to permit the alumina to be employed to advantage in the production of aluminum.

For the removal of the silica from alumina obtained from alunite, or from other alumina containing silica wherein the alumina has been rendered insoluble in hydrofluoric acid, by first heating to the temperatures hereinafter referred to, I may proceed, in accordance with the present invention, in various ways. Thus, I may mix the alumina with a solution, in water, of hydrofluoric acid, in excess of the amount required to combine with all of the silica contained in the alumina. This mixture should preferably be stirred repeatedly and may then be allowed to stand at ordinary atmospheric temperatures, for about 12 hours and until the reaction is complete. The strength of the solution employed for the treatment of alumina obtained, as described, from calcined alunite may vary from 5% to 48%, but I have found that there is no advantage (except in shortening somewhat the time required for the operation) in using the higher percentages. I prefer using a 25% solution, the employment of which for the treatment of alumina containing approximately 6% silica sufficing to reduce the silica contents to as low as from .01% to .10%; that is, removing substantially all the silica. I have found that the amount of alumina made soluble by this treatment is practically unimportant, not exceeding say from 2% to 3% of the alumina treated.

In order to separate the silica from the mass, at the termination of the treatment with the solution of hydrofluoric acid, the solution may be filtered, and the residue washed so as to free it as far as possible from hydrofluosilicic acid present. The residue may then be "ignited" in the open air, that is to say, heated in a flame at a temperature preferably higher than 700° C, whereupon the silicon fluorid formed is volatilized and driven off. Or, instead of filtering and washing out the hydrofluosilicic acid from the mass, the entire mixture may be evaporated to dryness and then ignited as described.

As hereinbefore indicated, the hydrofluoric acid may be employed in the gaseous state. This is effected, for instance, by passing the gaseous hydrofluoric acid through the alumina, which has been previously heated to a temperature sufficiently high to prevent the hydrofluoric acid from acting upon the alumina to any important extent. For the production of the best effects, in this treatment with hydrofluoric acid gas the temperature in the reaction vessel should be above 600° C. and the reaction should take place in the presence of steam or water vapors; as, for instance, by placing the silica-containing alumina in an iron retort, heated externally to a temperature above 600° C., and either allowing a solution of hydrofluoric acid gas in water to drop on the heated alumina, or, by conducting hydrofluoric acid gas, together with steam, through the retort.

The temperature to which the alumina should be raised in order to render it practically insoluble in hydrofluoric acid, in accordance with the present invention should preferably be as high as 1000° C., and it may to advantage be carried to still higher degrees, say up to 1500° C.

Under certain conditions, it may not be necessary or desirable to render all of the alumina insoluble. In such cases, the preliminary heating operation may stop short of conversion of more than a portion of the alumina into the insoluble condition. It will be understood, therefore, that my invention includes broadly the feature of rendering alumina insoluble in hydrofluoric acid, by raising it to the temperature required for that purpose, whether such conversion be quantitative or otherwise, so that the silica may be removed, regardless as to whether or not a portion of the alumina remains soluble and is afterward converted into fluorid by the action of the hydrofluoric acid.

Having thus described my invention what I claim is:—

1. The method of removing silica from alumina containing the same, which comprises first heating it to a temperature sufficiently elevated to render alumina practically insoluble in hydrofluoric acid, then subjecting it to the action of hydrofluoric acid and removing the product of the reaction; substantially as described.

2. The method of removing silica from alumina containing the same, which comprises first heating it to a temperature sufficiently elevated to render alumina insoluble in hydrofluoric acid, then subjecting it to the action of hydrofluoric acid and removing by ignition the product of the reaction; substantially as described.

3. The method of removing silica from alumina containing the same, which comprises first heating it to a temperature sufficiently elevated to render alumina insoluble in hydrofluoric acid, then subjecting it to the action of hydrofluoric acid and removing by ignition, assisted by preliminary washing, the product of the reaction; substantially as described.

4. The method of removing silica from alumina, which comprises first heating it to a temperature sufficiently elevated to render alumina insoluble in hydrofluoric acid, then subjecting it to the action of hydrofluoric acid in the presence of water, and removing the product of the reaction; substantially as described.

5. The method of removing silica from alumina, which comprises first heating it to a temperature sufficiently elevated to render alumina insoluble in hydrofluoric acid, then subjecting it to the action of hydrofluoric acid in the presence of water and at a temperature above 600° C. and removing the product of the reaction; substantially as described.

In testimony whereof I affix my signature, in presence of two witnesses.

HOWARD F. CHAPPELL.

Witnesses:
 M. A. BILL,
 JOHN C. PENNIE.